United States Patent [19]

Udagawa

[11] Patent Number: 4,714,260
[45] Date of Patent: Dec. 22, 1987

[54] STEEL LAMINATE GASKET

[75] Inventor: Tsunekazu Udagawa, Ichikawa, Japan

[73] Assignee: Ishikawa Gasket Co. Ltd., Tokyo, Japan

[21] Appl. No.: 18,222

[22] Filed: Feb. 24, 1987

[30] Foreign Application Priority Data

Jun. 26, 1986 [JP] Japan .................. 61-096713[U]

[51] Int. Cl.$^4$ .............................. F16J 15/08
[52] U.S. Cl. ...................... 277/235 B; 277/234; 277/236
[58] Field of Search .............. 277/233, 234, 235 R, 277/235 A, 235 B, 236, 200

[56] References Cited

U.S. PATENT DOCUMENTS

| | | |
|---|---|---|
| 4,213,620 | 7/1980 | Kennedy et al. ............... 277/235 B |
| 4,284,282 | 8/1981 | Lonne ........................... 277/234 X |

FOREIGN PATENT DOCUMENTS

| | | | |
|---|---|---|---|
| 1057861 | 2/1967 | United Kingdom ............ 277/235 B |
| 2103308 | 2/1983 | United Kingdom ............ 277/235 B |
| 482561 | 12/1975 | U.S.S.R. ........................ 277/235 B |

*Primary Examiner*—Robert S. Ward
*Attorney, Agent, or Firm*—Frank J. Jordan; C. Bruce Hamburg; Manabu Kanesaka

[57] ABSTRACT

A steel laminate gasket for an internal combustion engine having at least one hole therein comprises a first plate having at least one first hole, a second plate having at least one second hole, and at least one middle plate situated between the first and second plates. The second plate includes at least one second inner portion situated around the second hole, at least one curved portion extending radially outwardly from the second inner portion relative to the second hole and extending diagonally relative to the second inner portion, and an outer portion extending outwardly from the curved portion parallel to the second inner portion. The second inner portion abuts against the first plate. The middle plate includes at least one third hole slightly larger than the first and second holes, at least one inner edge around the third hole, at least one bead formed around the third hole adjacent to the inner edge, and an outside portion extending outwardly from the bead. The inner edge of the middle plate is situated adjacent to the curved portion.

8 Claims, 13 Drawing Figures

STEEL LAMINATE GASKET

BACKGROUND OF THE INVENTION AND RELATED ART STATEMENT

The present invention relates to a steel laminate gasket for an internal combustion engine, more particularly improved steel laminate gasket which can seal properly between two engine blocks of the engine.

In the steel laminate gasket, one of the very important things when the steel laminate gasket is designed is how portions around holes of the engine are securely sealed. If the portions around the holes of the engine is not properly sealed, the engine can not operate as intended. In this respect, there have been proposed many methods.

One conventional steel laminate gasket 20 is shown in FIG. 1, wherein the gasket 20 comprises an upper plate 21, a lower plate 22, a middle plate 23, and a middle plate 24 having a bead 25 around a hole 26 to be sealed. The lower plate 22 is provided with a curved portion 27 located around the hole 26, and an edge portion 28 situated above the upper plate 21. In the gasket 20, a periphery of the hole 26 between two engine blocks is surrounded and sealed by the curved portion 27.

Another conventional steel laminate gasket 30 is shown in FIG. 2, wherein the gasket 30 comprises an upper plate 31, a lower plate 32, a middle plate 33, a middle plate 34 having a bead 35 around the hole 26 to be sealed, and a cylindrical member 36. The cylindrical member 36 includes an upper portion 37 situated above the upper plate 31, a lower portion 38 situated below the lower plate 32, and a curved portion 39. In the gasket 30, a periphery of the hole 26 between the two engine blocks is surrounded and sealed by the curved portion 39 of the cylindrical member 36.

In the gasket 20, the curved portion 27 of the lower plate 22 has to be bent when assembled, while in the gasket 30, the curved portion 39 of the cylindrical member 36 must be bent as well when assembled together. Namely, in the gaskets 20, 30, metal bending procedure is required. Therefore, in case a hole to be sealed is small, configuration of the hole is complicated or metal quality relative to bending is not good, curved or bending portions may be cracked.

In the above conventional gaskets, the curved or bending portions constitute sealing portions of the gaskets. Therefore, if the curved or bending portions have cracks therein, sealing ability of the gasket decreases, and actually, the gasket can not be used any more. When the curved or bending portions are employed in the gaskets, cracks must not be formed in the curved or bending portions. In order to satisfy this requirement, the curved or bending portion must only be utilizeded in a gasket for sealing a hole which satisfies some requirement, i.e. size and configuration of the hole. Namely, the curved or bending portion can not be utilized for a small hole or a hole with complicated configuration.

When the curved or bending portion can not be employed in a gasket, a gasket 40 as shown in FIG. 3 is used. The gasket 40 comprises a seal ring 41 situated around the hole 26 to be sealed, and a body portion 42 for supporting the seal ring 41. The seal ring 41 includes a rubber ring portion 43, and a supporting plate 44 engaging the ring portion 43. The body portion 42 includes an upper plate 45, a lower plate 46, and two middle plates 47. A lateral depression 48 is formed between the upper and lower plates 45, 46 adjacent to the middle plates 47. A part of the plate 44 is situated in the depression 48 so that the seal ring 41 is engaged with the body portion 42.

When the seal ring 41 is employed, the structure of the gasket becomes complicated. Also, manufacturing cost of the gasket becomes expensive because of using an expensive heat resisting rubber. Further, quality of rubber goes wrong as time goes by. Therefore, the gasket 40 is not satisfactory.

When the curved or bending portion is not used, a gasket 50 as shown in FIG. 4 may also be used. The gasket 50 comprises an upper plate 51, a lower plate 52 and a middle plate 53 having a bead 54 around the hole 26, wherein a portion abutting against the hole 26 is not covered. In this case, the structure of the gasket 50 is simple, but fluid passing through the hole 26 may possibly penetrate through the plates of the gasket 50. Sealing ability of the gasket 50 is not good.

Accordingly, one object of the present invention is to provide a steel laminate gasket which can seal properly even in a small hole or a hole with complicated configuration.

Another object of the invention is to provide a steel laminate gasket as explained above, which can be effectively used for a long period of time.

A further object of the present invention is to provide a steel laminate gasket as explained above, which, when used around a water hole of an engine, can restrict water flow passing through the water hole while a portion around the water hole is effectively sealed.

A still further object of the present invention is to provide a steel laminate gasket as explained above, which can be manufactured economically.

Further objects and advantages of the invention will be apparent from the following description of the invention.

SUMMARY OF THE INVENTION

A steel laminate gasket of the present invention is used for an internal combustion engine having at least one hole therein. The gasket comprises a first plate having at least one first hole, a second plate having at least one second hole, and at least one middle plate situated between the first and second plates.

The second plate includes at least one second inner portion situated around the second hole, at least one curved portion extending radially outwardly from the second inner portion relative to the second hole and extending diagonally relative to the second inner portion, and an outer portion extending outwardly from the curved parallel to the second inner portion. The second inner portion abuts against the first plate. the middle plate includes at least one third hole slightly larger than the first and second holes, at least one inner edge around the third hole, at least one bead formed around the third hole adjacent to the inner edge, and an outside portion extending outwardly from the bead.

The inner edge of the middle plate is situated adjacent to the curved portion. Therefore, when the gasket is compressed, the inner edge abuts against the curved portion of the second plate and does not move substantially inwardly any more. Consequently, the bead on the middle plate forms strong sealing pressure thereat and seal the engine effectively.

The gasket of the invention is preferably provided with means for connecting the first and second plates together adjacent to the first and second holes so that the inner edge of the middle plate abuts against the curved portion of the second plate whenever the gasket is tightened in use.

The gasket of the invention is useful as a cylinder head gasket. Especially, in case the engine blocks are provided with a plurality of small holes for cooling water, oil and so on, the gasket of the invention can seal efficiently.

DETAILED DESCRIPTION OF PREFERRED EMBODIMENTS

Figure 1:
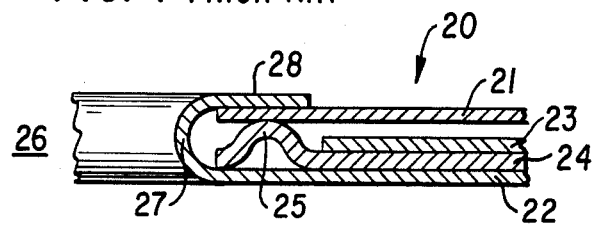
FIGS. 1-4 are explanatory section views for showing parts of conventional steel laminate gaskets.
Figure 2:
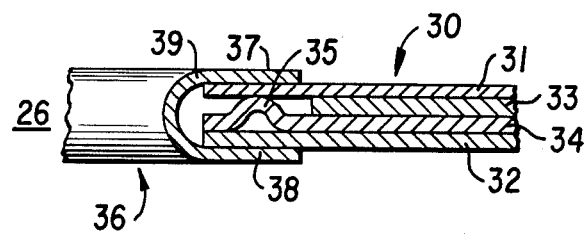
Figure 3:
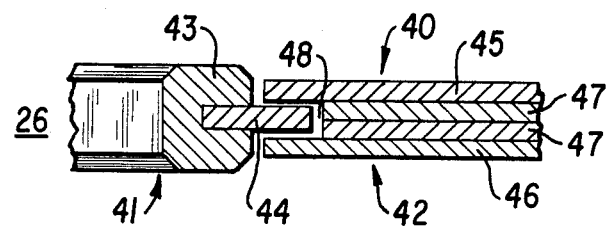
Figure 4:
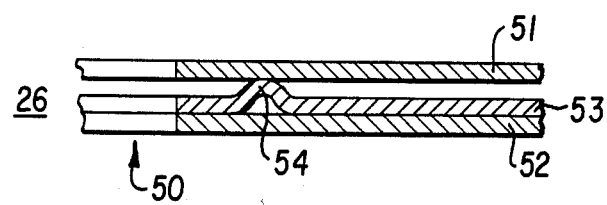
Figure 5:
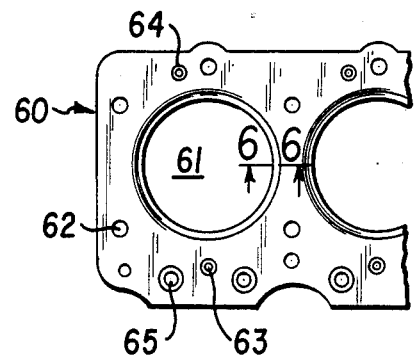
FIG. 5 is a plan view of a part of a first embodiment of a steel laminate gasket of the present invention.
Figure 6:
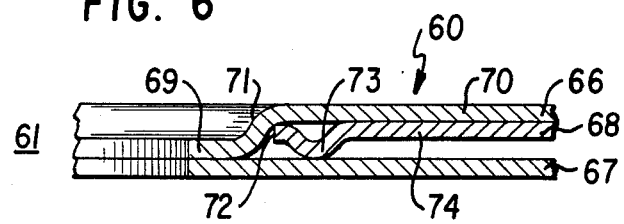
FIG. 6 is an enlarged section view taken along line 6—6 in FIG. 5.
Figure 7:
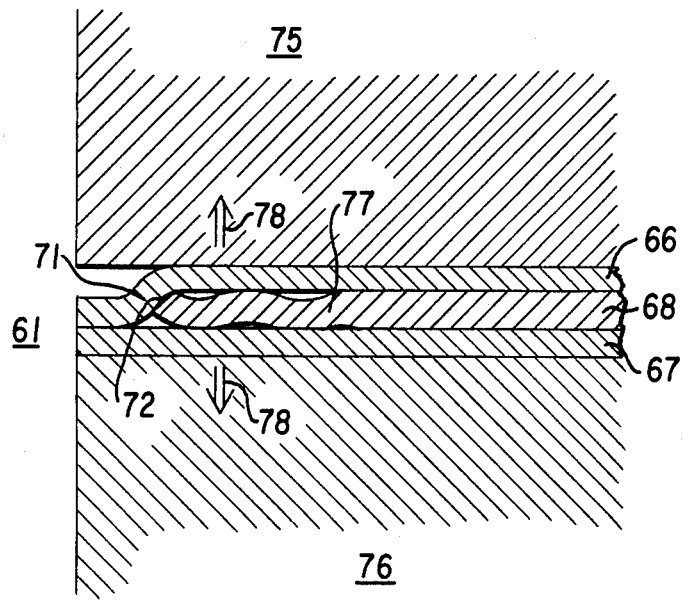
FIG. 7 is an explanatory section view of a part of the first embodiment of the invention for showing the gasket when tightened.

Referring to FIGS. 5-7, a first embodiment 60 of a steel laminate gasket of the invention is shown. The steel laminate gasket 60 is designed to be used as a cylinder head gasket and includes cylinder bores 61 and small holes 62, 63, 64 and 65 for bolts, cooling water, oil and push rods, respectively. The steel laminate gasket 60 of the invention is useful for easily and tightly sealing the small holes 63, 64 and 65 for cooling water, oil and push rods as well as cylinder bores 61.

The structure around the small holes 63, 64 and 65 and the cylinder bores 61 is the same. Therefore, for explanation, a section across the cylinder bore 61 taken along line 6—6 in FIG. 5 is shown in FIG. 6.

As shown in FIG. 6, the gasket 60 comprises an upper plate 66, a lower plate 67 and a middle plate 68 situated between the upper and lower plates 66, 67. The upper plate 66 is provided with an inner portion 69 facing the cylinder bore 61, an outer portion 70 and a curved portion 71 between the inner portion 69 and the outer portion 70. The lower plate 67 is a flat plate, on which the upper plate 66 is placed, wherein the inner portion 69 abuts against the lower plate 67 and the outer portion 70 extends parallel to the lower plate 67.

The middle plate 68 is provided with an inner edge 72 situated adjacent to the curved portion 71 of the upper plate 66, a bead 73 extending toward the lower plate 67, and an outside portion 74. The outside portion 74 abuts against the outer portion 70 of the upper plate 66.

When the gasket 60 assembled as shown in FIG. 6 is situated between a cylinder head 75 and a cylinder body 76 and is tightened by bolts 76' (in FIG. 13), the gasket 60 is squeezed between the cylinder head 75 and the cylinder body 76 and deforms as shown in FIG. 7. Namely, the bead 73 of the middle plate 68 deforms and becomes a corrugated portion 77.

When the corrugated portion 77 is formed, firstly, the inner edge 72 moves toward the cylinder bore 61. However, when the inner edge 72 abuts against the curved portion 71, further movement of the inner edge 72 is prevented. Although the outside portion 74 of the middle plate 68 slightly moves outwardly, high pressure is applied to the inner edge 72. This high pressure acts also to push the corrugated portion 77 upwardly. Namely, since inward movement of the inner edge 72 is prevented by the curved portion 71, high sealing pressure, which is shown by arrow 78, is formed at the corrugated portion 77. This high sealing pressure acts to securely seal between the cylinder head 75 and the cylinder body 76.

Figure 8:
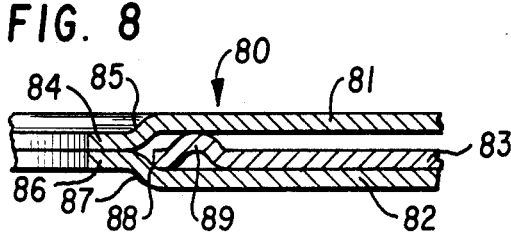
FIG. 8 is an explanatory section view of a part of a second embodiment of a steel laminate gasket of the invention.

FIG. 8 shows a second embodiment 80 of a steel laminate gasket of the invention. The gasket 80 comprises an upper plate 81, a lower late 82 and a middle plate 83 between the upper and lower plates 81, 82. The upper plate 81 includes an inner portion 84 and a curved portion 85, while the lower plate 82 includes an inner portion 86 and a curved portion 87. The inner portions 84, 86 abut against each other. The middle plate 83 includes an inner edge 88 situated adjacent to the curved portion 87 and a bead 89. The gasket 80 operates as in the gasket 60, but the gasket 80 is especially useful for an engine requiring a thick gasket.

Figure 9:
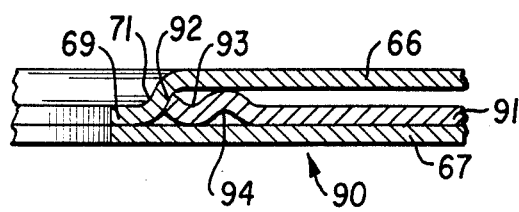
FIG. 9 is an explanatory section view of a part of a third embodiment of a steel laminate gasket of the invention.

FIG. 9 shows a third embodiment 90 of a steel laminate gasket of the invention. The gasket 90 comprises the upper plate 66 having the inner portion 69 and the curved portion 71, and the lower plate 67, as in the gasket 60. However, situated between the upper and lower plates 66, 67 is a middle plate 91, which is provided with an inner edge 92 situated adjacent to the curved portion 71, and beads 93, 94. The gasket 90 operates as in the gasket 60. However, since the gasket 90 includes two beads 93, 94, high sealing pressure is formed between two engine blocks in use.

Figure 10:
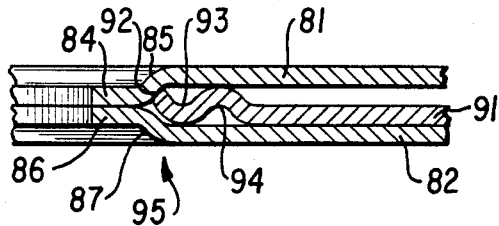
FIG. 10 is an explanatory section view of a part of a fourth embodiment of a steel laminate gasket of the invention.

FIG. 10 shows a fourth embodiment 95 of a steel laminate gasket of the invention. The gasket 95 comprises the upper and lower plates 81, 82, as in the gasket 80 shown in FIG. 8, and the middle plate 91, as in the gasket 90 shown in FIG. 9. The gasket 95 is used for an engine requiring a thick gasket.

Figure 11:
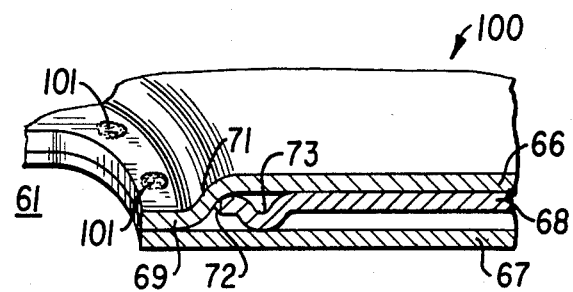
FIG. 11 is a perspective section view of a part of a fifth embodiment of a steel laminate gasket of the invention.

FIGS. 11 shows a fifth embodiment 100 of a steel laminate gasket of the invention. The gasket 100 comprises the upper plate 66 having the inner portion 69 and the curved portion 71, the lower plate 67, and the middle plate 68 having the inner edge 72 and the bead 73, as in the gasket 60 shown in FIG. 6. In the gasket 100, the inner portion 69 of the upper plate 66 and the lower plate 67 are welded together around the cylinder bore 61 by spot welding 101 spaced apart from each other at a predetermined distance. The spot welding is also applied around the holes 63-65 shown in FIG. 5.

In the gasket 100, the upper and lower plates 66, 67 are welded together around the cylinder bore 61, so that when the gasket 100 is tightened, the inner portion 69 does not open relative to the lower plate 67. Consequently, inward movement of the middle plate 68 is effectively prevented, whereby high sealing pressure is formed around the bead 73.

Figure 12:
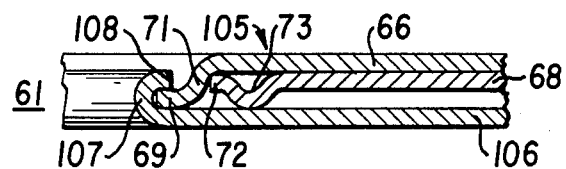
FIG. 12 is an explanatory section view of a part of a sixth embodiment of a steel laminate gasket of the invention.

FIG. 12 shows a sixth embodiment 105 of a steel laminate gasket of the invention. The gasket 105 comprises the upper plate 66 having the inner portion 69 and the curved portion 71, and the middle plate 68 having the inner edge 72 and the bead 73, as in the gasket 60 shown in FIG. 6, and a lower plate 106. the lower plate 106 is provided with a curved flange 107 adjacent the cylinder bore 61. The curved flange 107 extends upwards toward the upper plate 66, and an edge 108 of the flange 107 is located above the inner portion 69. Consequently, the inner portion 69 of the upper plate is securely connected to the lower plate 106. Accordingly, when the gasket 105 is tightened, the inner portion 69 does not open relative to the lower plate 106, whereby high sealing pressure is formed around the bead 73.

In the gasket 100, spot welding is used for connecting the upper plate 66 and the lower plate 67, but seam welding may be applied. Further, in the gasket 105, the flange 107 is formed around the entire periphery of the cylinder bore 61, but a plurality of flanges spaced apart from each other may b formed around the bore 61 for connecting the upper and lower plates. Also, the flange may be formed on the upper plate instead of the lower plate.

In the steel laminate gasket of present invention, one of the upper and lower plates is provided with a curved portion around a hole to be sealed, and an end of a middle plate having a bead therein is situated adjacent to the curved portion. therefore, when the gasket is tightened, the bead is deformed, so that the end of the middle plate is moved toward the curved portion of the plate. However, inward movement of the middle plate is prevented by the curved portion. Consequently, the bead forms pressure toward engine blocks higher than that obtained when the curved portion is not formed.

In the steel laminate gasket of the invention, the sealing operation for sealing between two engine blocks is substantially made on the upper and lower plates around the bead of the middle plate. In other words, no sealing pressure is directly formed on the inner portion of the upper plate and a portion of the lower plate corresponding to the inner portion of the upper plate. Therefore, the inner portion of the upper plate and the corresponding portion of the lower plate may be located in any places inside the engine.

On the other hand, when the same type of engines are utilized for various purposes, temperature to be maintained in the engines may occationally be different due to purposes. In this case, relatively large water holes or passages are formed in the engine, and a water hole of a gasket is designed to restrict the water flow in the engine. Namely, the water hole of the gasket is made smaller than the water passages in the engine blocks. The dimension of the water hole of the gasket is regulated, so that temperature of the engine is changed.

In the present invention, the inner portion of the gasket around a hole of the engine is not utilized for sealing, while the outside of the inner portion held between the engine blocks can securely seal between the engine blocks. Therefore, the inner portion of the gasket of the present invention can be used for regulating the water flow in the engine.

Figure 13:
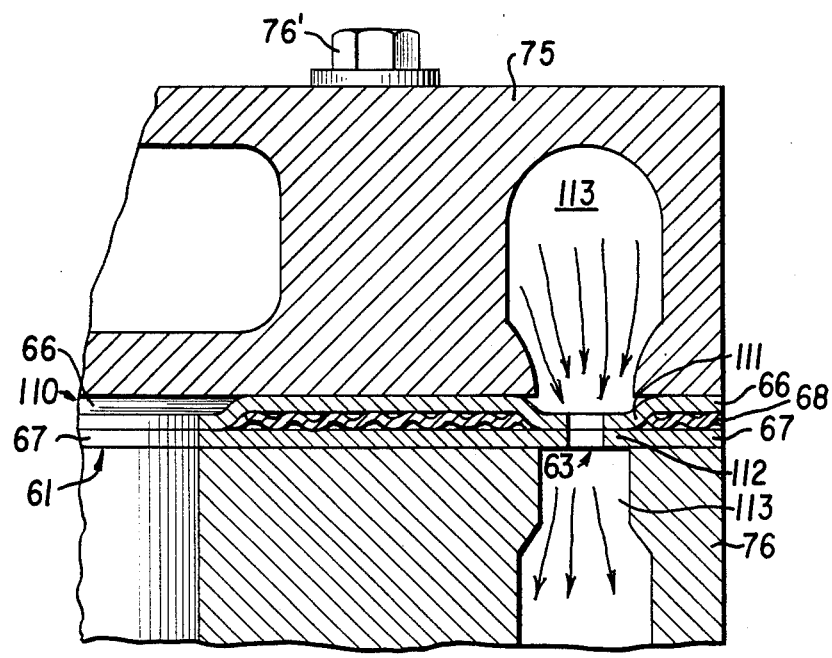
FIG. 13 is an explanatory section view of an engine, wherein a part of a seventh embodiment of a steel laminate gasket of the invention is situated.

FIG. 13 shows a gasket 110 of the present invention used for regulating the amount of water flow in the engine as well as sealing around the cylinder bore 61. As clearly shown in FIG. 13, an inner portion 111 of the upper plate 66 and an inner portion 112 of the lower plate 67, which constitute the hole 63 for cooling water, project inside a water passage 113 of the engine. Accordingly, an amount of water passing through the water passage 113 is regulated by the gasket 110 of the present invention. The corrugated portions formed on the middle plate 68 are situated between the cylinder head 75 and the cylinder body 76.

In the gasket 110 of the invention, a portion around the water passage 113 can be securely sealed and an amount of cooling water passing through the water passage 113 can be restricted as intended.

While the invention has been explained with reference to the specific embodiments of the invention, explanation is illustrative and the invention is limited only by the appended claims.

What is claimed is:

1. A steel laminate gasket for an internal combustion engine having at least one hole therein;
   a first plate having at least one first hole corresponding to the hole of the engine and at least one first inner portion around the first hole,
   a second plate having at least one second hole corresponding to the hole of the engine, at least one second inner portion situated around the second hole and abutting against the first plate, at least one curved portion extending radially outwardly from the second inner portion relative to the second hole and extending diagonally relative to the second inner portion, and an outer portion extending outwardly from the curved portion parallel to the second inner portion, and
   at least one middle plate situated between the first and second plates, said middle plate having at least one third hole slightly larger than the first and second holes, at least one inner edge formed around the third hole, said inner edge being situated adjacent to the curved portion, at least one bead formed around the third hole adjacent the inner edge, and an outside portion formed outside the bead, said middle plate, when the gasket is compressed, actuating so that the inner edge abuts against the curved portion of the second plate to allow the bead to form strong sealing pressure thereat.

2. A steel laminate gasket according to claim 1, further comprising means for connecting the first and second plates together adjacent the first and second holes so that the inner edge of the middle plate securely abuts against the curved portion of the second plate whenever the gasket is tightened in use.

3. A steel laminate gasket according to claim 2, in which said connecting means is welding formed on the first and second plates.

4. A steel laminate gasket according to claim 2, in which said connecting means is a curved flange formed on one of the first plate and the second plate, said curved flange formed on one of the first and second plates extending from one of the first and second inner portions toward one of the first and second plates which does not have the curved flange and being turned outwardly to be located thereon.

5. A steel laminate gasket according to claim 2, in which said middle plate is provided with two beads adjacent to each other, said beads abutting against the first and second plates respectively.

6. A steel laminate gasket according to claim 2, in which said first plate further includes at least one second curved portion extending radially outwardly from the first inner portion relative to the first hole and extending diagonally relative to the first inner portion, and a second outer portion extending outwardly from the second curved portion parallel to the first inner portion, said first inner portion of the first plate abutting against the second inner portion of the second plate.

7. A steel laminate gasket according to claim 2, in which the hole of the engine is a water hole, diameter of said first and second holes being smaller than the water hole of the engine to restrict water flow passing therethrough.

8. A steel laminate gasket according to claim 7, in which said first and second inner portions are located in the water hole so that the middle plate cooperates with the first and second plates to seal around the hole.

* * * * *